United States Patent [19]

Taylor et al.

[11] Patent Number: 4,817,716
[45] Date of Patent: Apr. 4, 1989

[54] PIPE CONNECTOR AND METHOD OF APPLYING SAME

[75] Inventors: William M. Taylor, Houston; Thomas G. Cassity, Katy, both of Tex.

[73] Assignee: Cameron Iron Works USA, Inc., Houston, Tex.

[21] Appl. No.: 44,583

[22] Filed: Apr. 30, 1987

[51] Int. Cl.[4] .............................................. E21B 29/10
[52] U.S. Cl. .................................... 166/277; 166/207; 166/380; 285/382.4
[58] Field of Search ................ 166/115, 177, 207, 212, 166/277, 380; 285/140–143, 382.4, 382.5

[56] References Cited

U.S. PATENT DOCUMENTS

| | | | |
|---|---|---|---|
| 2,134,311 | 10/1938 | Minor et al. | 285/140 X |
| 2,438,529 | 3/1948 | Woodling | |
| 2,477,676 | 8/1949 | Woodling | |
| 2,495,352 | 1/1950 | Smith | |
| 3,191,677 | 6/1965 | Kinley | 166/277 |
| 3,194,310 | 7/1965 | Loomis | 166/277 X |
| 3,432,916 | 3/1969 | Fisher et al. | |
| 3,534,988 | 10/1970 | Lindsey | 285/382.4 |
| 4,330,144 | 5/1982 | Rideenour | 285/382.5 |
| 4,388,752 | 6/1983 | Vinciguerra et al. | 29/421 R |
| 4,593,448 | 6/1986 | Aggradi et al. | 29/523 |

Primary Examiner—William P. Neuder
Attorney, Agent, or Firm—Vinson & Elkins

[57] ABSTRACT

An improved repair connector for a subsea tubular member and the method of making such repair. The improved repair connector includes a annular housing and an annular guide, said annular housing having internal grooves filled with pressure compensating material, a concave recess having serrations therein, a rib having a downwardly facing shoulder on the interior of said housing, threads on the upper interior of said housing for receiving a string, and means carried by said guide for sealing against the exterior of a string on which the connector is to be installed. Also, a band of brittle material is positioned within a groove in the exterior of the housing which generates a noise upon the deformation of the housing responsive to completion of the forming of the tubular member therein. The method of connecting the improved connector includes the steps of preparing the casing at a level below the defect, lowering the improved connector into engagement with the upper end of the prepared casing within the well bore, exerting deforming pressure within the upper end of the casing to deform the casing into sealing engagement within the internal grooves in the connector, and releasing and recovering the means generating the deforming pressure.

10 Claims, 4 Drawing Sheets

PIPE CONNECTOR AND METHOD OF APPLYING SAME

BACKGROUND

The development of weak spots or leaks in tubular members in locations not accessible to repair, such as in subsea wellheads, creates serious repair problems. When such repairs are needed in a well casing string, it has been the practice to cut the casing in the well bore below the bad spot, removing the upper cut portions of the casing string, installing a packer type of patch by slipping it over the permanent part of the casing string and securing it to the casing string and then reconnecting good casing to the patch to complete the casing string.

Another method includes removing the casing above the damaged or bad area, lowering an overshot type of casing patch having a lower bowl carrying a spiral grapple into surrounding relation to the upper portion of the casing in the well bore, and engagement of the patch with the casing is followed by lifting the string to compress the lead to form a highly effective seal between the casing and the patch.

Another solution which has been proposed is to provide an internal steel tubing covered with a glass mat and epoxy resin. When set, the corrugated patch expands radially to conform symmetrically to the casing bore. Also, it is claimed that the epoxy resin extrudes into cavities in the tubing or casing wall to act as a gasket and sealing agent.

Still another solution which is disclosed in U.S. Pat. No. 2,495,352 is to remove the string above a break and lower another string which has an enlarged lower end into surrounding relationship to the upper end of the broken string in the well. A plastic material is pumped down the new string with a plug set into the top of the broken string so that the plastic is diverted into the annulus between the enlarged lower end and the upper end of the broken string and also around the exterior of the enlarged lower end. The setting of the plastic provides an uninterrupted bore extending through the lower broken string, through the set plastic and into the upper string.

It has been known to utilize internal pressure to form a first tubular member placed within a second tubular member having internal grooves so that the first tubular member is deformed into such grooves to provide a positive seal and also to join the two tubular members. Examples of this type of joint forming are shown in U.S. Pat. Nos. 4,388,752; 4,330,144; 2,438,529; 2,477,676; and 3,432,916. U.S. Pat. No. 4,593,448 discloses the use of half rings of collapsible material positioned within the grooves of the outer members when the forming is to be done under water. The function of the material is to permit forming which would otherwise be limited or prevented by the entrapment of water in the grooves. Also, it avoids the obvious solution of porting the grooves to the exterior of the second tubular member which avoids entry of water or other materials which could limit the useful life of the formed joint.

SUMMARY

The present invention relates to an improved repair of a subsea tubular member and the method of making such repair. The improved pipe connector includes a tubular member having an annular guide, a coupling attached to the guide, said coupling having internal grooves filled with pressure compensating material, a downwardly facing shoulder on the interior of said coupling, means on the interior of said coupling above said shoulder for supporting engagement by a running tool, threads on the upper interior of said coupling for receiving a string, and means carried by said guide for sealing against the exterior of a string on which the connector is to be installed. Also, a band of material is positioned within a groove in the exterior of the coupling which generates a noise upon the deformation of the coupling responsive to internal pressure forces. The method of connecting the improved connector includes the steps of severing the casing at a level below the bad spot, lowering the improved connector into engagement with the upper end of the casing within the well bore, exerting deforming pressure within the upper end of the casing to deform the casing into sealing engagement within the internal grooves in the connector, and releasing and recovering the means generating the deforming pressure.

An object of the present invention is to provide an improved connector which may be quickly and easily connected to the upper end of a well casing within a well bore.

Another object is to provide an improved casing connector which can be remotely secured and sealed around the upper end of a well casing within a well bore.

A further object is to provide an improved method of patching a well casing with a connector within the well bore which results in a metal-to-metal sealing of the casing within the internal grooves of the connector.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
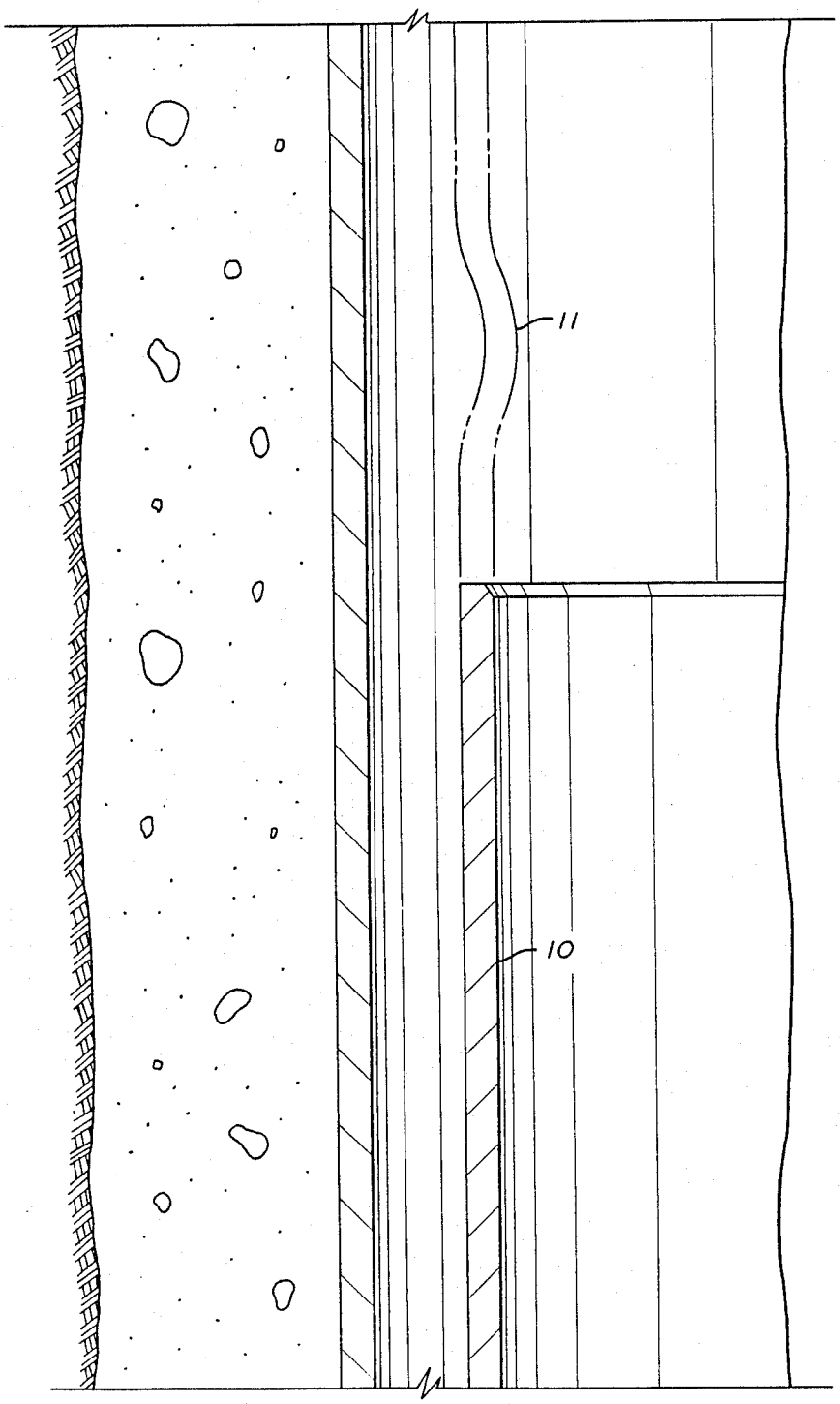
FIG. 1 is a sectional view of well casing within a well bore that has been severed below an imperfection.

As shown in FIG. 1, well casing 10 has been severed at a point below the defect and has been prepared so that it is ready to receive its repair parts. This preparation includes severing the casing 10 below the defect and providing its upper end with a clean square upper surface and an internal bevel as shown in FIG. 1. The improved repair connector 12 is lowered on string 14 into engagement with the upper end of casing 10 and with guide 16 and annular housing 18 positioned in surrounding relation to casing 10. Repair connector 12 includes guide 16 and annular housing 18 with guide 16 threaded into the lower end of annular housing 18 and string 14 which is threaded into the upper end of annular housing 18 for the running repair connector 12 into its desired repair position.

Guide 16 includes groove 20 on its inner surface near the lower end of annular housing 18 with packing ring 22 positioned therein. Also, guide 16 includes lower tapered entrance 21 which assists in the landing of repair connector 12 on the upper end of the well casing. Annular housing 18 is a high strength tubular member having upper internal threads 24 into which string 14 connects, rib 26 immediately below threads 24 with groove 28 therein, internal sealing section 30 including a plurality of internal grooves 32 at least partially filled with pressure compensating material, such as microspheres in a matrix of epoxy or syntatic foam, and gripping section 34 including concave recess 36 lined with a plurality of serrations 38. External groove 40 in annular housing 18 is filled with a brittle material 42, such as a thermosetting resin or a ceramic material for reasons hereinafter explained.

Figure 2:
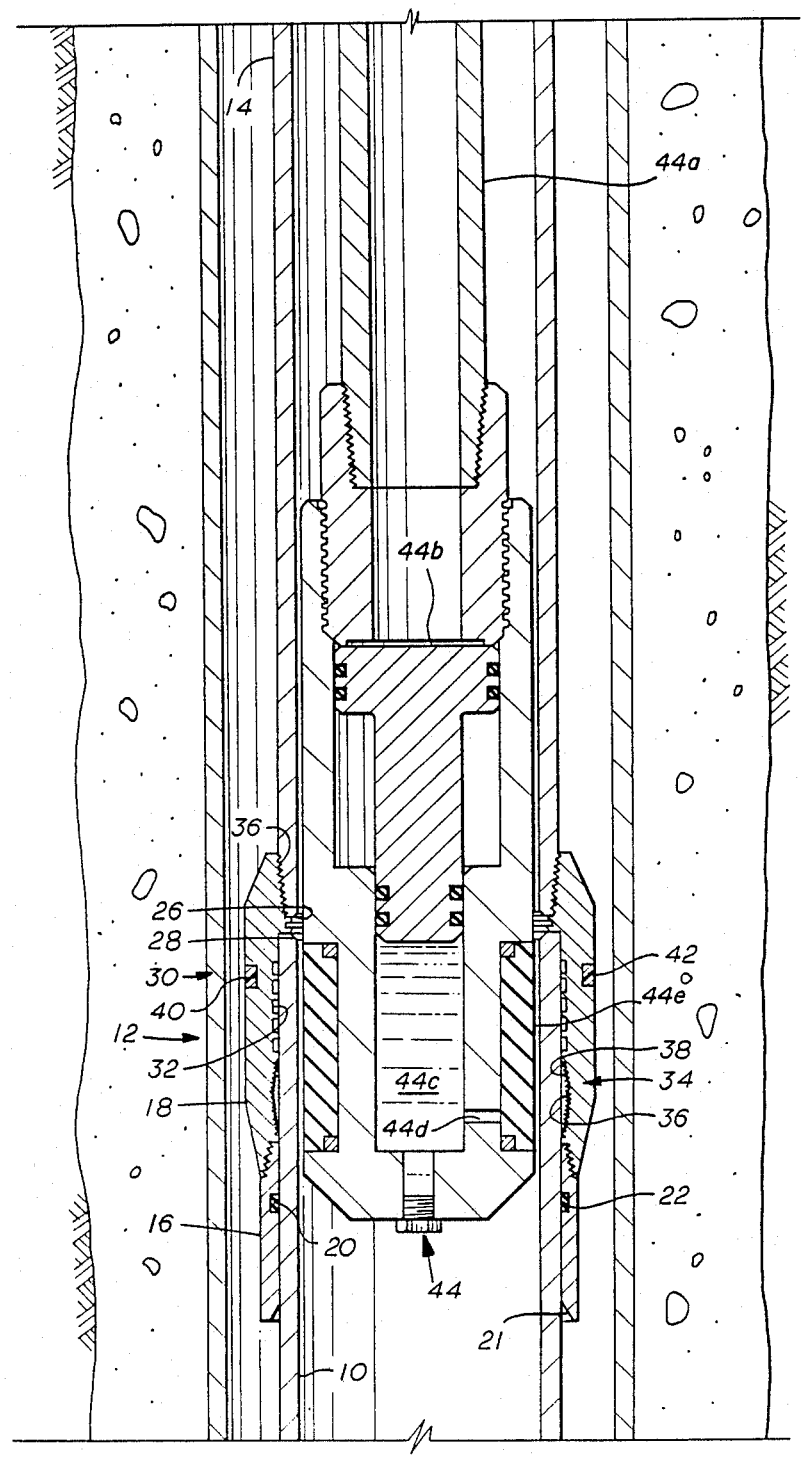
FIG. 2 is a sectional view of the well casing with the improved connector landed on the upper end of the well casing and with the setting tool positioned therein.
Figure 3:
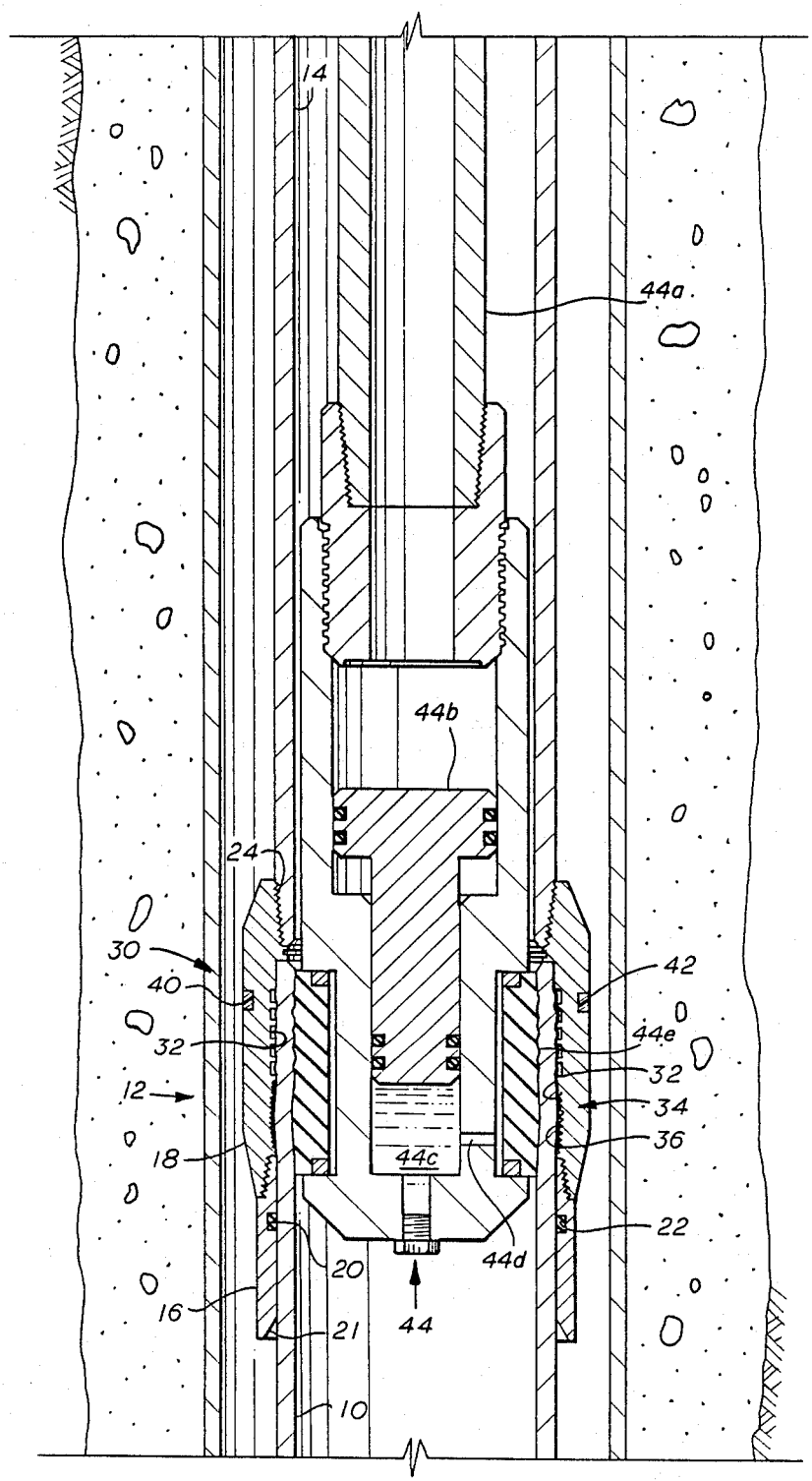
FIG. 3 is another sectional view illustrating the forming of the casing into the connector.
Figure 4:
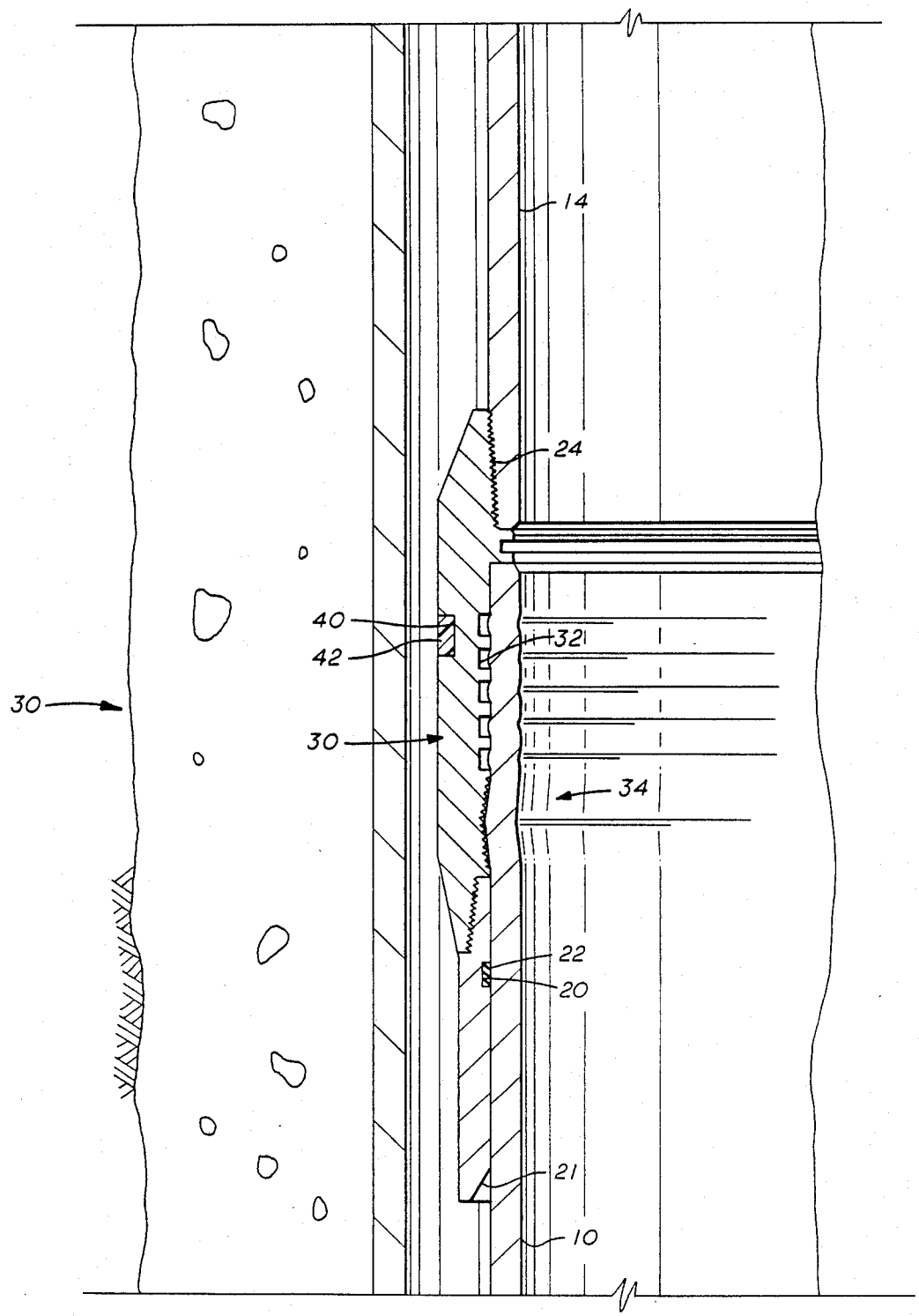
FIG. 4 is another sectional view of the connector after the removal of the forming tool and with the casing connecting into the connector.

Forming tool 44 is lowered through string 14 and landed with its locator in engagement with rib 26 and its groove 28 to ensure proper location. With tool 44 within the upper end of casing 10, pressure is delivered through tool 44 and exerted uniformly on the interior of casing 10. Tool 44 is lowered into position within casing 10 on string 44a as shown in FIG. 2. The fluid under pressure is delivered through string 44a which forms a pair of tool 44 and is exerted on the upper side of multiplier piston 44b to cause it to move from the position shown in FIG. 2 to the position shown in FIG. 3. This movement of piston 44b exerts a force on the fluid in tool chamber 44c so that it is forced through port 44d and is exerted on the interior of resilient sleeve 44e to deform well casing against the interior of housing 18. Upon completion of the pressure forming step the pressure on the tool 44 is released and tool 44 is recovered from within casing 10 by lifting of string 44a. A complete description of such tool is shown and claimed in copending application Ser. No. 07/411,409, filed April 30, 1987 and assigned to the same assignee as the present application. The level of pressure is to be sufficient to deform casing into both sealing section 30 and gripping section 34 into tight engagement within grooves 32 and within serrations 38 within concave recess 36. When sufficient deformation has occurred, sufficient hoop tension will develop in annular housing 18 to cause cracking of brittle material 42. Brittle material 42 is preselected so that it cracks at the yield in the exterior of annular housing 18 which ensures that casing 10 has been sufficiently pressure formed into sealing and gripping sections 30 and 34 to provide a pressure tight joint in casing which is sufficiently strong for the requirements of a casing joint. The cracking or other failure of brittle material 42 creates sufficient noise that it can be detected at the upper end of string 14 so that the operator knows that the joining of casing 10 into annular housing 18. When forming is complete pressure is released and sleeve 44e retracts so that tool 44 can be recovered on string 44a leaving the components as shown in FIG. 4.

What is claimed is:

1. A casing repair connector comprising:
   a tubular housing having means at its upper end for connecting to a string extending upwardly from its upper end, internal rib locating means below said connecting means and internal sealing and gripping profiles below said rib locating means, said sealing and gripping profiles including annular grooves in the interior of said tubular housing, and an annular shallow recess lined with serrations,
   a tubular guide connected to the lower end of said tubular housing to guide said housing in locating it in surrounding relationship to the upper end of the casing to be repaired,
   said tubular housing being sufficiently strong to withstand deformation of the upper end of the casing into gripping and sealing engagement with the interior of said tubular housing,
   an annular groove on the interior of said tubular guide, and
   resilient packing means positioned within said annular groove in said tubular guide for sealing against the exterior of said casing.

2. A casing repair connector according to claim 1 including:
   pressure compensating material in said annular grooves.

3. A casing repair connector according to claim 3 wherein:
   said pressure compensating material includes microspheres in a matrix selected from the group of epoxy and syntatic foam.

4. The method of repairing a damaged casing within a well bore including the steps of:
   preparing the upper end of the damaged casing,
   lowering a casing repair connector into surrounding relation to the upper end of the prepared casing,
   said casing repair connector having internal sealing and griping means immediately surrounding the exterior of the upper end of the casing,
   lowering a pressure forming tool into the upper interior of said prepared casing,
   delivering fluid under pressure to said pressure forming tool to pressure form the casing into sealing and gripping engagement with said internal sealing and gripping means within said casing repair connector, and
   recovering said pressure forming tool.

5. The method according to claim 4 including the step of:
   detecting the completion of the forming step by sensing the noise generated by the fracturing of a brittle band of material carried in the exterior of the casing repair connector.

6. A casing repair connector comprising:
   a tubular housing having means at its upper end for connecting to a string extending upwardly from its upper end, internal rib locating means below said connecting means and internal sealing and gripping profiles below said rib locating means, and
   a tubular guide connected to the lower end of said tubular housing to guide said housing in locating it in surrounding relationship to the upper end of the casing to be repaired,
   said tubular housing being sufficiently strong to withstand deformation of the upper end of the casing into gripping and sealing engagement with the interior of said tubular housing.

7. A casing repair connector according to claim 6 wherein said sealing and gripping profiles include:
   annular grooves in the interior of said tubular housing, and
   an annular shallow recess lined with serrations.

8. A casing repair connector according to claim 6 including:
   an annular groove on the interior of said tubular guide, and
   resilient packing means positioned within said annular groove in said tubular guide for sealing against the exterior of said casing.

9. A casing repair connector according to claim 6 including:
 a groove around the exterior of said tubular housing at the level slightly below the level of the internal locating means, and
 a brittle material filling said external groove in said tubular housing, said brittle material being selected to fail at a preselected hoop tension to produce an audible noise.

10. A casing repair connector according to claim 9 wherein:
 said brittle material is selected from the group consisting of a thermosetting resin and a ceramic.

* * * * *

UNITED STATES PATENT AND TRADEMARK OFFICE
CERTIFICATE OF CORRECTION

PATENT NO. : 4,817,716

DATED : April 4, 1989

INVENTOR(S) : William M. Taylor and Thomas G. Cassity

It is certified that error appears in the above—identified patent and that said Letters Patent is hereby corrected as shown below:

Please delete the serial number, column 3, line 34, "07/411,409" and insert therefor "07/044,409."

In column 3, line 53, after "housing 18" insert "is complete".

In column 4, line 27, delete "griping" and insert therefor "gripping".

Signed and Sealed this

Twenty-seventh Day of November, 1990

Attest:

HARRY F. MANBECK, JR.

*Attesting Officer*  *Commissioner of Patents and Trademarks*